(No Model.) H. J. BOON. 3 Sheets—Sheet 3.
SPEED INDICATOR.
No. 557,954. Patented Apr. 7, 1896.
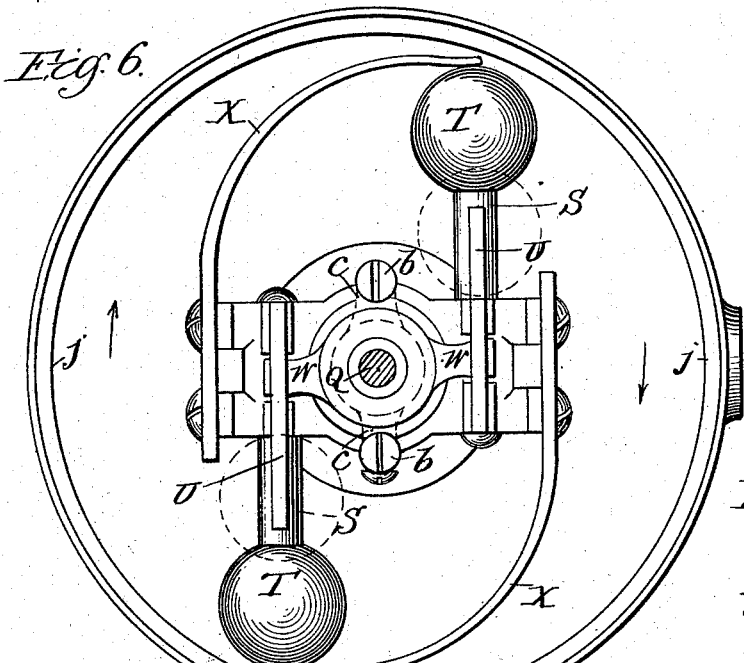
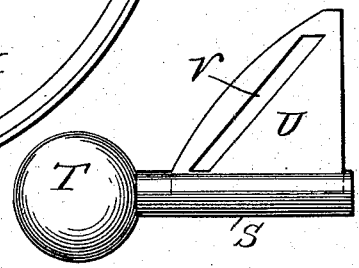
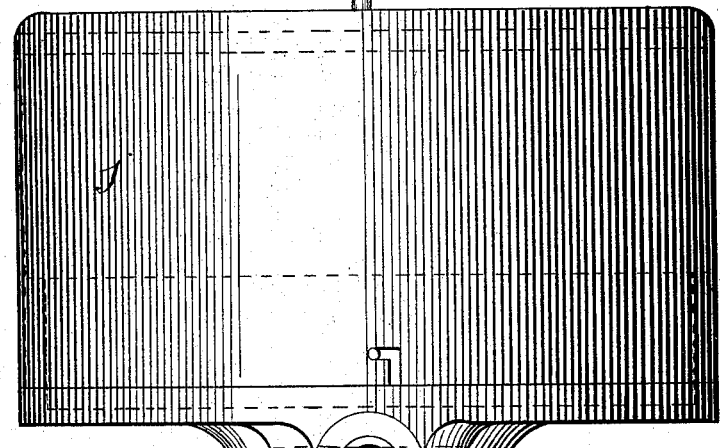
Witnesses.
Inventor.

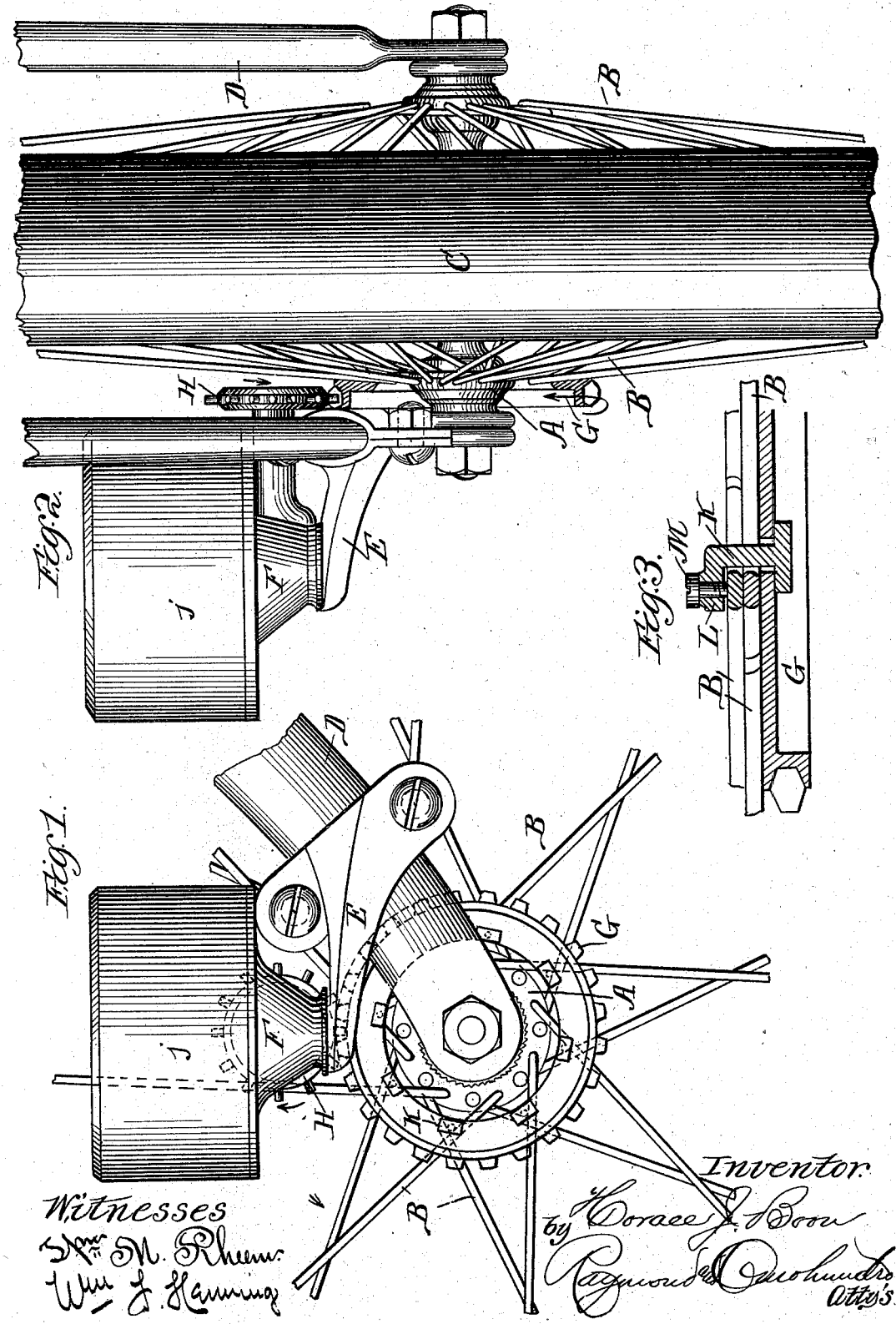

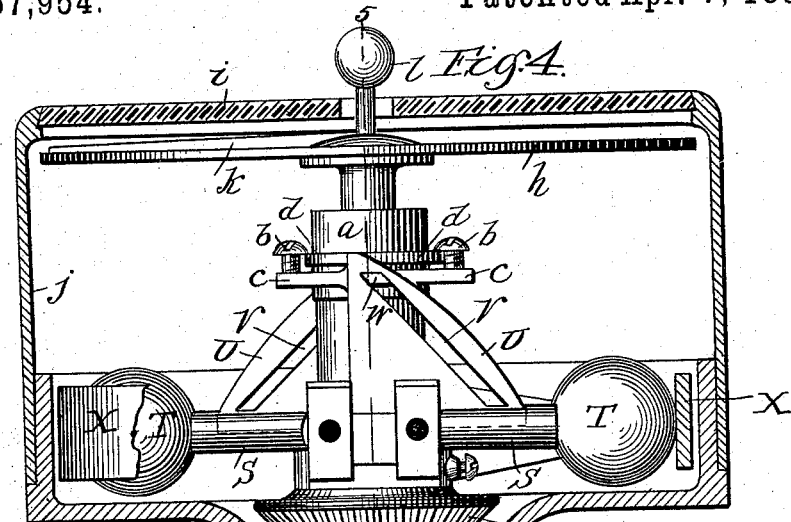
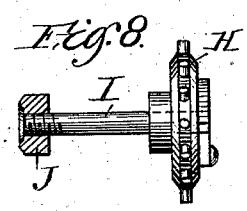
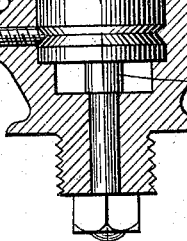
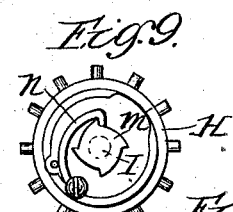
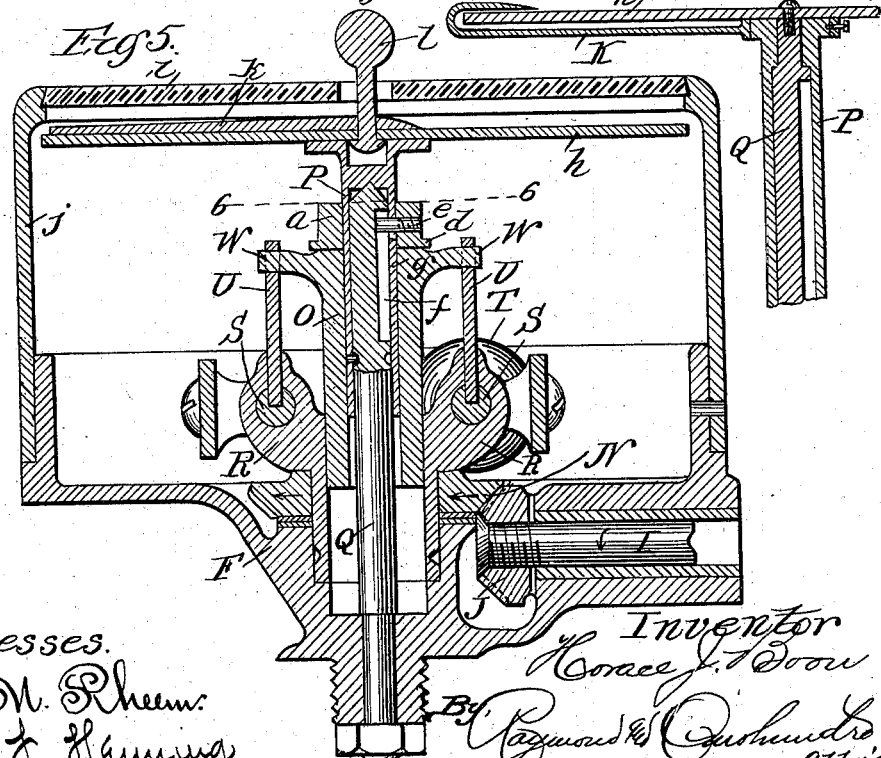

UNITED STATES PATENT OFFICE.

HORACE JOHN BOON, OF CALUMET, MICHIGAN.

SPEED-INDICATOR.

SPECIFICATION forming part of Letters Patent No. 557,954, dated April 7, 1896.

Application filed February 23, 1895. Serial No. 539,503. (No model.)

*To all whom it may concern:*

Be it known that I, HORACE JOHN BOON, a citizen of the United States, residing at Calumet, in the county of Houghton and State of Michigan, have invented certain new and useful Improvements in Speed-Indicators, of which the following is a full, clear, and exact description, reference being had to the accompanying drawings, forming a part of this specification.

This invention relates to improvements in that class of devices known as "speed-indicators," for indicating on a dial the speed of rotation of a shaft or wheel or the travel of a vehicle to which it is applied.

The prime object of this invention is to produce a speed-indicator especially adapted for use in connection with bicycles, tricycles, and the like arranged for location in such position that the rider can tell at a glance the speed per mile at which he is riding without calculation or the use of any other instrument.

Other objects are to utilize centrifugal force, through the intermediary of suitable gearing, to indicate upon either a fixed or movable dial the speed of rotation of the part to which the indicator is applied; to convey by rectilinear movements the rotary action of the centrifugal devices to the rotary indicating devices, and to have the construction of the instrument cheap, simple, and durable, yet accurate and certain in its operation.

These and such other objects as will appear farther on are attained by the devices illustrated in the accompanying drawings, in which—

Figure 1 represents a side elevation of a portion of the front wheel of a bicycle and its fork, showing a speed-indicator embodying my invention applied thereto. Fig. 2 is a rear elevation of the same. Fig. 3 is a detail view showing the means for attaching the master-gear to the spokes of a bicycle-wheel. Fig. 4 is a central vertical section through the casing containing the operative parts of my indicator, the latter being shown in side elevation. Fig. 5 is a transverse vertical section on the line 5 5 of Fig. 4; Fig. 6, a horizontal section on the line 6 6 of Fig. 5; Fig. 7, a side elevation of the indicator, taken on the opposite side to Fig. 1, showing the same detached from its support; Fig. 8, a detail side elevation of the driving-shaft with its gears; Fig. 9, an end elevation thereof. Fig. 10 is a detail view of a governor-ball with its shank and slotted plate, and Fig. 11 a modification of the dial and index arrangement.

Similar letters of reference indicate the same parts in the several figures of the drawings.

The more common use of a speed-indicator of the character herein shown and described will be in connection with a bicycle, although it is obvious that it is capable of and adapted for use in connection with any vehicle or any shaft or wheel for indicating the speed thereof; but because of its especial adaptability, desirability, and capability of use in connection with a bicycle I have shown the same in the drawings as applied to such use and will limit the description thereto, without, however, thereby intending to restrict my invention to any such use.

It is desirable that a bicycle-rider, whether in training, in a race, or in road-riding, should know with certainty at what speed he is going, and preferably be able to determine at a glance at what rate per mile he is traveling, so that his efforts may be accordingly directed and controlled. Furthermore, if he sets out to travel a given distance in a particular time, or undertakes to ride for a certain length of time or against time, it is desirable that he should know the rate per mile at which he is traveling at all times, in order that he may know whether the speed at which he is traveling will accomplish his task.

My speed-indicator is intended to serve these desirable purposes, and by preference is attached to the front fork of the bicycle, where it is constantly in plain view and easily read, and where the cyclist, without mental calculation or the use of a watch or other aid, can tell at a glance whether he is going at the rate of a mile in two, three, four, or five minutes, or any fraction thereof, at any time he may desire to know.

Referring now to the accompanying drawings, A indicates the hub, B the spokes, C the tire, and D the front fork, of a bicycle of any ordinary or desired construction.

Fastened to one tine of the fork, by means of a suitable clip, is a bracket E, to which is rigidly secured the base F of my speed-indicator, which may be of any desired or suitable dimensions and configuration, and which may be detachably or otherwise secured to the bracket.

To the spokes B is rigidly secured a master-gear G, with which meshes a spur-gear H, mounted upon one end of a shaft I, journaled in the base F, upon the opposite end of which shaft is screwed or otherwise mounted a beveled pinion J, through the medium of which power is transmitted from the master-gear to the working parts of my indicator. The manner of attaching the master-gear G to the spokes is more clearly illustrated in Fig. 3, in which is shown a headed L-shaped bracket K, the head of which impinges against the outer face of the gear G, the body of which passes through said gear and between and beyond the spokes B, and the angular end of which terminates in a threaded boss L, through which works a set-screw M, impinging against the inner one of each pair of spokes at their point of crossing, so as to firmly clamp the gear G against the outer set of spokes.

On the governor-carrier, which is stepped in the base F, is rigidly mounted a bevel-gear N, which meshes with and is driven by the pinion J, the governor-carrier being centrally bored to receive a sleeve O, which is splined to the base, so that, while it has free longitudinal or axial movement with relation to the base, it is compelled to rotate in unison therewith. Within the sleeve O works another sleeve P, which has rotary but no endwise movement, being supported upon the upper end of a pillar or spindle Q, rigidly secured at its lower end to the base F.

The governor-carrier is provided at opposite sides with horizontally-bored or tubular projections R, in which freely slide the shanks S of balls or weights T, which latter are oppositely disposed—that is to say, the shanks are inserted and the balls extend in opposite directions from their respective supports. Each of these shanks carries a plate U, having therein oblique slots V, the slots being oppositely disposed with relation to each other, because the plates move in opposite directions. With these slots engage radial lugs W, (which may, if desired, carry anti-friction-rollers,) projecting from the upper end of the sleeve O, so that when the balls move outwardly or inwardly toward and away from their support the sleeve will be caused to move vertically up and down while rotating with the governor-carrier.

As shown in the drawings, the governor balls or weights and the other parts of the indicator are in the positions they would occupy at the highest speed which the instrument is capable of indicating.

It is obvious that the tubular bearings or projections R must be slotted in order to permit of the endwise movements of the plates U under the influence of the governor balls or weights, which are moved outwardly by centrifugal force and inwardly by the springs X, secured to the tubular bearings or projections R, or by equivalent means.

Loosely mounted upon the sleeve P is a collar $a$, which is engaged with the sleeve O and compelled to move vertically therewith by any suitable means, such as by screws $b$, (see Figs. 4 and 5,) which are screwed into radial lugs $c$ on the sleeve O, with their heads overlapping an annular flange $d$ on said collar. This collar $a$ is prevented from rotating with the sleeve O by means of a pin or screw $e$, which engages a longitudinal groove $f$ in the spindle Q and passes through a helical slot $g$ in the sleeve P. Hence whenever the collar is moved up and down upon the sleeve P the said sleeve has imparted thereto, through the medium of the pin $e$ and spiral slot $g$, a rotary motion, which is in one direction when the collar moves upward and is in the opposite direction when the collar moves downward.

Upon the upper end of the sleeve P is mounted a dial $h$, having a graduated scale on the upper face thereof, which scale will indicate minutes and seconds to any desired number, say from one to five minutes. Immediately above the dial is a glass plate $i$, secured in a cylindrical casing $j$, supported upon the base F and inclosing and protecting the working parts of my indicator. Upon this glass plate I mark in any manner a straight radial line, which registers with zero upon the dial when the indicator is at rest. As the machine gets under motion and the governor-weights begin to move outwardly, the sleeve O, and consequently the collar $a$, begin to rise, thereby imparting to the dial $h$, through the medium of the sleeve P, the rotary movement which causes the scale on the face of the dial to move under the line on the plate $i$, and whatever figure on the dial comes under the line indicates the speed at which the bicycle is traveling per mile in minutes and seconds. This method of indicating is not arbitrary, but is illustrative of the uses of my device, and, obviously, other methods of utilizing the device for indicating the speed of traveling may be employed without departing from the spirit of my invention. For instance, an adjustable index-finger $k$ may be attached to the dial in any suitable manner, with just sufficient looseness to permit of its being turned and adjusted with relation to the scale upon the dial, and yet will be sufficiently tight to turn with the dial when unrestrained, a thumb-piece $l$ being provided, projecting through a central perforation in the glass plate $i$, for convenience of manipulation or adjustment of the pointer or index.

With this device, should the rider conclude to ride at a certain predetermined speed per mile, he can set the index accordingly, and need then only watch the indicator to see that the index and line upon the glass plate are coincident in order to be certain that he is riding at the desired speed, as the indicator will move up to position beneath the line as the speed of the bicycle is increased to the desired maximum, moving beyond such line when the speed of the wheel is greater than the desired maximum, and moving back toward zero whenever the speed is lessened.

In Fig. 11 I have shown a modification of the arrangement of the index and dial in which the line on the glass plate *i* may be dispensed with, the dial in this case being fixed and the index or pointer movable. This is accomplished by having the dial mounted on and rigidly secured to the protruding end of the spindle Q, while the index or pointer is attached to the upper end of the sleeve P beneath the dial, but is bent over the face thereof, so as to terminate in an index-point. Hence in operation the index will move over the scale upon the dial and point upon such scale to the speed at which the bicycle is traveling.

To avoid too sudden stopping of the indicating mechanism should the rider suddenly reduce the speed of the bicycle, I prefer to provide between the gear H and the shaft I a pawl-and-ratchet connection, such as that shown in Figs. 8 and 9, so arranged that when the rotation of the wheel H is suddenly arrested the shaft, under the influence of the rapidly-rotating governor-balls, may still continue to turn. Though a very desirable and necessary arrangement, such a device is exceedingly simple and well understood in the art and is exemplified by the devices shown in Figs. 8 and 9, in which the ratchet-wheel *m* is rigidly secured to the shaft I, while the gear H is loose upon the shaft, but is provided with a spring or spring-actuated pawl *n*, adapted and arranged to engage the teeth of the ratchet *m* when the gear H is turned in one direction, but to ride over the teeth of said ratchet when the said gear is turned in the opposite direction or, what is the equivalent thereof, when the gear is restrained or arrested in its rotation, so as to rotate at less speed than the ratchet.

A speed-indicator constructed in accordance with my invention is simple, cheap, and durable, cannot be materially affected by the vibration of a bicycle or other vehicle to which it is applied and will indicate with certainty at any time the speed at which the machine is traveling, promptly answering to all changes of speed, whether increasing or decreasing. Obviously various modifications of the construction and arrangement of the "gearing" or "harness" (by which terms I mean the various gears, levers, and cams) connecting the centrifugal devices with the indicating devices may be made without departing from the spirit of my invention, although the construction and arrangement shown and described are preferred because of the simplicity and durability thereof.

Having described my invention, what I claim, and desire to secure by Letters Patent, is—

1. In a speed-indicator, the combination with a rotatable dial and a fixed index, of a rotary governor-carrier provided with horizontally-bored projections, oppositely-disposed governor-weights having a sliding bearing in the bored projections of said carrier, a vertically-movable sleeve mounted within the carrier and actuated by the governor-weights, and mechanism connecting said sleeve with the dial so as to impart an oscillatory motion to the dial by or through the vertical movements of said sleeve, substantially as described.

2. In a speed-indicator, the combination with a rotatable dial and a fixed index, of a rotary governor-carrier provided with horizontally-bored projections, oppositely-opposed governor weights or balls having a sliding bearing in the bored projections of said carrier, slotted plates attached to said weights, a vertically-movable sleeve mounted within the carrier, radial projections on the upper portion of said sleeve engaging the slots in said plates, and intermediate mechanism connecting said sleeve with the dial, for imparting an oscillatory motion thereto by or through the vertical movements of the sleeve, substantially as described.

3. In a speed-indicator, the combination with a rotary carrier provided with horizontally-bored projections, governor balls or weights having a sliding bearing in the bored projections of said carrier, a vertically-movable sleeve mounted within and rotating with said carrier, and means for imparting movements of said sleeve from said weights or balls, of a second sleeve fitting and working within the first-mentioned sleeve and provided with a helical slot, a collar loose upon the second-mentioned sleeve and vertically movable with the first-mentioned sleeve, but held against rotation, a pin or projection on said collar engaging the helical groove in the second-mentioned sleeve, a dial mounted on and turning with the second-mentioned sleeve, and a fixed index, substantially as described.

4. In a speed-indicator, the combination with a rotary carrier provided with horizontally-bored projections, governor balls or weights having a sliding bearing in the bored projections of said carrier, a vertically-movable sleeve mounted upon and rotating with said carrier, and means for imparting movement to said sleeve from said weights or balls, of a second sleeve working in the first-mentioned sleeve, a fixed spindle supporting the same passing axially through both of said sleeves and the carrier, having a longitudinal groove therein, a collar loose upon the second-mentioned sleeve and resting upon the first-named sleeve, a pin or projection on said collar engaging a helical groove in the second-mentioned sleeve and engaging the longitudinal groove in the fixed spindle, a dial mounted upon and rotating with the second-mentioned sleeve, and a fixed index, substantially as described.

5. In a speed-indicator, the combination with a rotary carrier provided with horizontally-bored projections, oppositely-disposed governor weights or balls having a sliding bearing in the bored projections of said carrier, a vertically-movable sleeve mounted within and rotating with said carrier, slotted plates secured to said weights, and radial projections on the upper portion of said sleeves engaging the inclined slots in the plates, of a second sleeve fitting and working axially in the first-mentioned sleeve, but held against vertical movement, a collar loose upon said second-mentioned sleeve and vertically movable with the first-mentioned sleeve, but held against rotation, a pin or projection on said collar engaging a helical groove or slot in the second-mentioned sleeve said collar being held against rotation by said pin, a dial mounted upon and turning with said second-mentioned sleeve, and a fixed index, substantially as described.

6. In a speed-indicator, the combination with a rotary carrier supported by the indicator-base and having a fixed gear thereon, a shaft journaled within said base and having a pinion meshing with said gear on one end and a gear on its opposite end adapted and arranged for operative connection with a vehicle-wheel, of oppositely-disposed governor balls or weights having a sliding bearing in the horizontally-bored projections of said carrier, and an indicating mechanism operated thereby, substantially as described.

7. In a speed-indicator, the combination with a rotary carrier provided with horizontally-bored projections, a fixed gear on the lower end of said carrier, a bevel-gear meshing with said fixed gear and mounted on one end of a shaft, a gear on the opposite end of said shaft adapted and arranged for operative connection with a vehicle-wheel, and a pawl-and-ratchet connection between said shaft and last-mentioned gear, of governor balls or weights having a sliding bearing in the bored projections of said carrier, and an indicating mechanism operated thereby, substantially as described.

8. In a speed-indicator, the combination with a rotary carrier carried by the indicator-base, a fixed gear on the lower end of said carrier, a bevel-gear meshing therewith and mounted on one end of a shaft, and a gear on the opposite end of said shaft adapted and arranged for operative connection with a wheel of a vehicle, of governor-balls having a sliding bearing upon said carrier, a sleeve mounted in and rotating with said carrier, and means connected to the upper portion of said sleeve and to the weights for imparting vertical movement to said sleeve from said weights or balls, a rotatable dial, a fixed index, and means, substantially as described, for imparting an oscillatory movement to said dial by or through the vertical movements of said sleeve, substantially as described.

9. In a speed-indicator, the combination with a rotary carrier supported by the indicator-base and having a fixed gear mounted on the lower portion thereof, a shaft journaled in said base, a pinion on one end of said shaft within the base and gearing with said fixed gear, a gear on the opposite end of said shaft adapted to engage with a fixed gear on a vehicle-wheel, of oppositely-disposed governor balls or weights having sliding bearings in the bored projections of said rotary carrier, and indicating mechanism operated thereby, substantially as described.

10. In combination with a speed-indicator and a rotary governor-carrier, of a master-gear rigidly secured to a vehicle-wheel, double-headed bolts passing through the master-gear and adapted to secure the same to the spokes at a point where said spokes cross each other by a set-screw passing through one of the heads of the bolts to impinge against the spoke-surface, and intermediate mechanism for operating the governor-carrier, the latter operating the intermediate mechanism, all substantially as shown and described.

HORACE JOHN BOON.

Witnesses:
 FRANCIS WARD,
 HARRY KING.